March 31, 1964 P. FROST 3,127,267
AUTOMATIC PHOTOGRAPHIC COLOR PRINTING
Filed Oct. 25, 1955 3 Sheets-Sheet 1

INVENTOR.
Paul Frost
BY
his attorneys

March 31, 1964     P. FROST     3,127,267
AUTOMATIC PHOTOGRAPHIC COLOR PRINTING

Filed Oct. 25, 1955     3 Sheets-Sheet 2

INVENTOR.
Paul Frost
BY
his attorneys

March 31, 1964 P. FROST 3,127,267
AUTOMATIC PHOTOGRAPHIC COLOR PRINTING
Filed Oct. 25, 1955 3 Sheets-Sheet 3
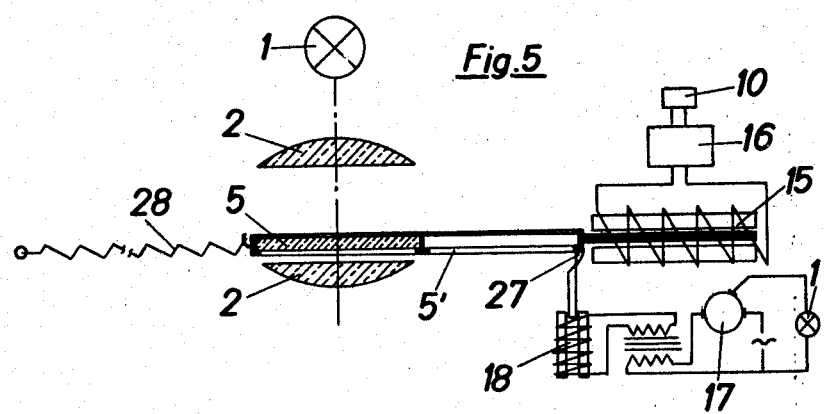
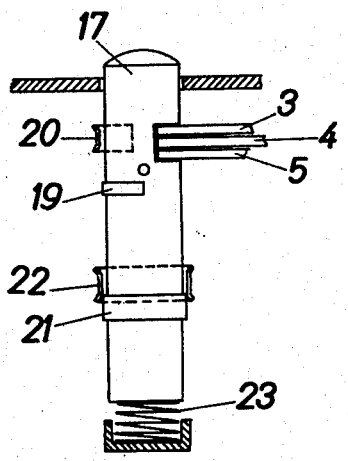
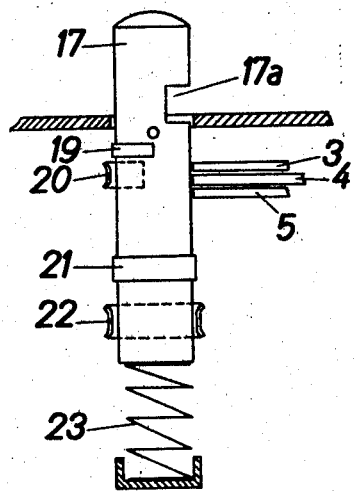
INVENTOR.
Paul Frost

United States Patent Office 3,127,267
Patented Mar. 31, 1964

3,127,267
AUTOMATIC PHOTOGRAPHIC COLOR PRINTING
Paul Frost, Munich, Germany, assignor to Agfa Aktiengesellschaft, Leverkusen, Germany, a corporation of Germany
Filed Oct. 25, 1955, Ser. No. 542,691
10 Claims. (Cl. 96—23)

The present invention relates to a method and an automatic filter control and exposure control device for printing or enlarging colored images.

The method of the invention is based on the assumption that in most color photographs all the component colors are represented to an approximately uniform extent so that it is convenient to make a summation of the whole image area of the color negative or positive, both as regards its color composition and also as regards its density and to utilize this summation value so as to obtain especially a neutral gray.

In the known methods of this kind the color and density components of the color negative have been measured with the aid of photoelectric cells and the intensity of the printing light has been regulated according to this previously taken measurement. The exposure of the color-sensitive paper was performed in three consecutive steps through additive filters after the requisite printing light had been measured and adjusted.

The present invention, on the other hand, measures the color and density components of the color negative and simultaneously regulates the duration of exposure of the color sensitive coating. White light is projected through the negative upon a color-sensitive material. The quantities of light corresponding to the various preselected color components of the light are measured. When the quantity of each preselected color component reaches a predetermined value it is interrupted. When the last component of the light is interrupted, the printing process is terminated.

The quantities of light may be measured by photoelectric means, and the various components may be interrupted by interposing subtractive color filters in the path of the light impinging upon the color-sensitive material. Means may be provided for adjusting the sensitivity of the photoelectric means measuring each of the color components. The sensitivity of these photoelectric means are especially adjusted so that the color components of the exposed and developed color-sensitive coating integrate to correctly reproduce gray.

The apparatus required for the performance of the present method comprises several photoelectric cells sensitive to specific ranges of the spectrum, by means of which the color and density components are determined during the exposure. Each of these cells is connected to a typical phototube-relay circuit which actuates a device, for example, a solenoid to interpose a subtractive filter into the path of the printing light. The overall exposure time of the color-sensitive coating is completed by the interposition of the last color filter.

According to the invention the photoelectric cells may be arranged between negative and lens, or behind a half-silvered mirror located between lens and positive plane, or behind a reflector located before or after the positive plane. In the last mentioned case, according to the invention, the light passing through the light-sensitive paper may be measured. When the photoelectric cells are located near the positive plane, they should selectively receive the mixed and collected light of the whole image area, by way of one or more reflectors. If desired, these reflectors may be positioned beside the enlarging frame.

According to the invention the subtractive color filters, or their mounts respectively, may control the switch for the printing light in a manner such that the current supply to the lamp is automatically switched off when the last subtractive color filter has been interposed.

The proposed printing apparatus considerably simplifies and accelerates the printing and enlarging of color negative since, instead of several sources of colored light hitherto required to expose the light-sensitive material and to measure consecutively the density and color components, the invention uses only one source of white light. The white light contains practically all component colors from which the predonderant color component of the color image (color cast) is selectively eliminated by the automatic interposition of subtractive color filters. According to the invention it is no longer necessary to measure the component colors of the color negative before the exposure and only then to perform the printing with the use of the requisite compensating filters, since the density and color components are now measured during printing or enlarging, and these components are applied to cause the printing light to be switched off at the right moment. Much shorter exposures are thus possible than with the known additive color filtering method.

The novel features and advantages of the present invention will become apparent to one skilled in the art from a reading of the following description in conjunction with the accompanying drawings, in which:

FIG. 5 is a schematic electrical diagram and view in elevation of a portion of an embodiment of the present invention; and FIGS. 6 and 7 are schematic cross-sectional views in elevation of switch portions of an embodiment of the present invention in alternative positions.

Figure 1:
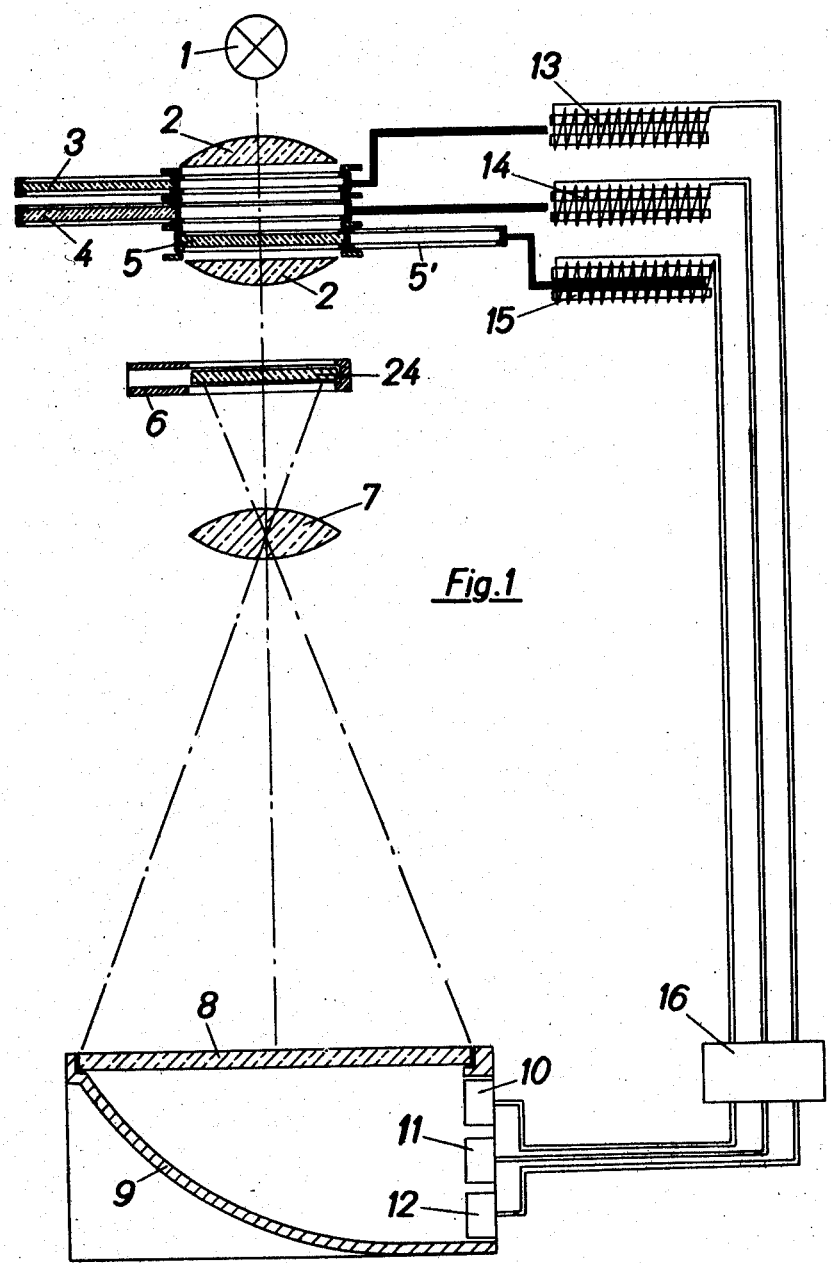
FIG. 1 is a schematic view in elevation, partially in cross section, of one embodiment of the present invention.

Referring to the drawings, 1 represents the source of white light of an enlarger, 2 is the optical condenser, 3, 4, 5 are subtractive color filters, 6 is the carrier for a color negative 24, 7 is the lens and 8 the easel (positive plane).

In FIG. 1 is a reflector 9 is provided, but a white surface may be used instead. This reflector collects the colored light coming from the whole projected image and transmitting through the light-sensitive material, situated on the easel 8, and directs it on three photoelectric cells 10, 11, and 12. The photoelectric cells are either sensitized so that they respond only to specific ranges of the spectrum, or they are fitted with filters in the additive primary colors. Each cell 10, 11, and 12 is connected to a typical phototube-relay circuit represented by rectangle 16 which actuates respective solenoids 13, 14, and 15 to interpose a corresponding color filter when each cell has been exposed to a predetermined quantity of its color component. Rectangle 16 represents a group of typical phototube-relay circuits which may be, for example, of the type described in Phototubes by Radio Corporation of America, Form PT–20R1, 3–48, copyright 1940, page 14, FIG. 12. Suitable solenoid-operating relays of known types may also be included within rectangle 16 to help operate solenoids 13, 14, and 15.

In FIGS. 5–7, push button 17 is the switch for the printing light. Slot 17a (FIGS. 6–7) is a recess to take the subtractive color filter mounts, contacts 19 and 20 are the contacts for a solenoid 18 (FIG. 5), and contacts 21 and 22 are the contacts for switching on the printing light 1. A spring 23 ensures that the push button 17 automatically returns to its initial position as soon as the exposure is completed.

Figure 2:
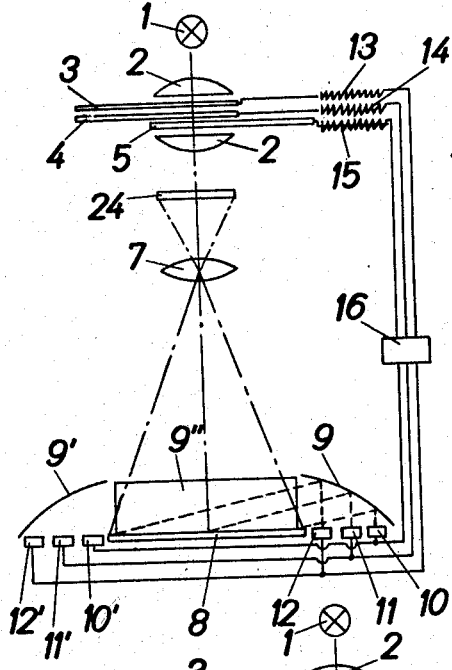
FIG. 2 is a schematic view in elevation of another embodiment of this invention.
Figure 3:
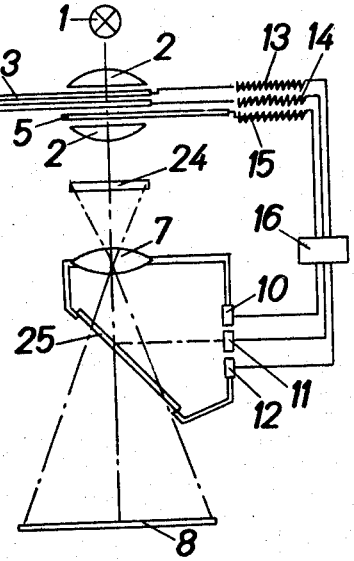
FIG. 3 is a schematic view in elevation of still another embodiment of this invention.
Figure 4:
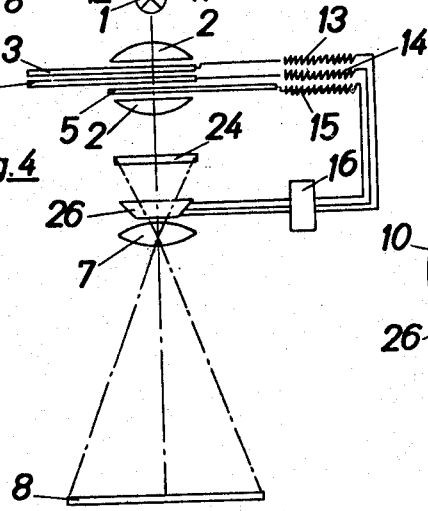
FIG. 4 is a schematic view in elevation of a further embodiment of this invention.
Figure 4A:
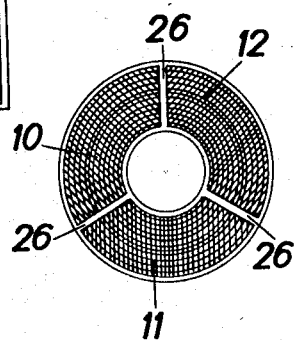
FIG. 4a is a schematic plan view of a portion of the embodiment shown in FIG. 4.

FIGS. 2 to 4a show various alternative ways of arranging the photoelectric cells 10, 11, and 12. Whereas the subtractive color filters 3, 4, and 5 can be located anywhere within the path of the illuminating or printing light, the photoelectric cells 10, 11, and 12 responding to the three additive primary colors are in these alternative cases in the path of the direct printing light, between the negative and the positive planes, or in the path of reflected printing light. In FIG. 2 two (or three) groups each of three photoelectric cells 10, 11, 12 or 10', 11', 12', are placed behind a reflector 9, 9', 9" each so that the light reflected by the enlarged image reaches them after it has been collected and mixed by a reflector. In FIG. 3 the photoelectric cells 10, 11, and 12 receive the colored light passing through the color negative 24 after it has been reflected by a half-silvered mirror 25, whereas in the arrangement according to FIGS. 4 and 4a the photoelectric cells are attached to a member 26 shaped as a truncated hollow cone. The cells located on the inside of the truncated hollow cone 26 and occupying sectors of 120° each are excited by the colored light passing through the negative 24, since beams of light issue in all directions from every point of the color negative.

In detail, the apparatus are operated as follows:

The color negative 24 is placed on the negative carrier 6 of the enlarger and the switch 17 is operated to turn on the white printing light 1. The beams of light which are colored in correspondence to the color contribution of the negative and incident upon the enlarger easel 8 excite three photoelectric cells 10, 11, and 12 each of which is sensitized for a specific range of the spectrum or is rendered sensitive to a specific color range, e.g. red, green and blue, by means of suitable filters fitted in front of them. Each cell cooperates with its respective phototube-relay circuit and solenoid to interpose its respective subtractive filter in front of the source of printing light when it has been exposed to a predetermined quantity of its color component. The interposition of each of the three filters 3, 4, and 5 occurs when the spectrum component corresponding to this filter has made its appropriate contribution to the exposure time, for example the blue-green filter 3 is brought into the path of printing light when the predetermined quantity of the red part of the printing light has reached the printing material. When the blue component predominates in the color negative, the yellow filter 4 is interposed first, and when the green component predominates, the purple filter 5 is interposed first, until, when all three subtractive color filters 3, 4, and 5 have been successively interposed and the requisite overall exposure has been completed, the printing light is switched off. After the third (last) color filter has been interposed, the push button switch 17 automatically returns to its initial position (see FIG. 7) and in so doing causes, either mechanically or by closing the circuit through the contact plates 19 and 20, the excitation of the solenoid 18 to release a hook 27 on the filter mount 5' whereby a retracting spring 28 is enabled to pull the filter automatically out of the path of the printing light. The apparatus is now ready for the next exposure operation.

The sensitivity of the photoelectric controlling devices is adjustable to provide a means for regulating the quantity of light of each preselected color component which impinges on the printing material. This provides the necessary adjustment for faithfully reproducing the various colors of the image, especially gray.

What is claimed is:

1. A method for controlling the exposure of color-sensitive printing material to printing light transmitted upon said material through a color transparency during the production of a color print which requires for said production printing light of the three primary colors, said method comprising the steps of projecting substantially white printing light including light components of the three primary colors upon said printing material through said transparency, taking a sample from substantially all of said printing light transmitted through said entire transparency, the quantities of said sample being fixed relative to that impinging upon said printing material, causing said sample to fall upon photoelectric cell means of three separate exposure controlling means which are adapted to be individually influenced by light of the three primary colors one each as said printing light is impinging upon said printing material for determining the quantities of the light of each of said three primary colors in said printing light which are impinging upon said printing material and for initiating individual signals when predetermined quantities of the light of each of said three primary colors have impinged upon said printing material, said predetermined quantities being precoordinated to reproduce said transparency by integrating to a substantially neutral gray independently of the content of any particular transparency, and utilizing said signals for individually and automatically terminating the projection of said light of said primary colors upon each printing material by interposing subtractive color filters into the path of said printing light impinging upon said printing material when said predetermined quantities of the light of primary colors to which said subtractive filter are respectively opaque have impinged upon said printing material.

2. An apparatus for printing a color print from a color transparency requiring for its reproduction light of the three primary colors upon a sheet of color-sensitive printing material, said apparatus comprising a printing light source which emits substantially white printing light including light components of the three primary colors, a carrier for said color-sensitive printing material, means for holding said transparency in the path of said printing light impinging upon said color-sensitive printing material, three separate exposure controlling means including photoelectric cell means being arranged to take a sample from the light transmitted substantially through said entire transparency whose quantity is fixed relative to that impinging upon said printing material independently of the content of any particular transparency, said exposure controlling means being adapted to be individually influenced by light of the three primary colors one each as said printing light is impinging upon said printing material, exposure-terminating means for terminating the exposure of said printing material to said light of each of said three primary colors, said exposure-terminating means incorporating three movably-mounted subtractive color filters, said color filters being disposed between said printing light source and said printing material and being arranged outside of said path of said printing light when said exposure of said printing material is commenced, said exposure-terminating means also incorporating automatic drive means connected to said subtractive color filters, circuit means connecting said automatic drive means with each of said exposure controlling means corresponding to the color of its respective filter for actuating said automatic drive means to interpose said color filters into said path of said printing light when said respective exposure controlling means determine that predetermined quantities of the light of primary colors to which said color filters are respectively opaque have impinged upon said printing material whereby the exposures of said color-sensitive printing material to said light of said respective primary colors are automatically interrupted, and said predetermined quantities being precoordinated prior to exposure of said printing material to said printing light to reproduce said transparency by integrating to a substantially neutral gray independent of the content of the particular transparency.

3. An apparatus as set forth in claim 2 wherein said subtractive color filters are respectively complementary to the light of said primary colors to which they are opaque.

4. An apparatus as set forth in claim 2 wherein said three primary colors are red, green and blue, and said three movably-mounted subtractive color filters are respectively blue-green, purple and yellow.

5. An apparatus as set forth in claim 2 wherein a switch is provided for controlling said light source, said switch including locking means for cooperating with said subtractive color filters to lock said switch in one of its positions; and said locking means and said subtractive color filters being constructed and arranged to allow said switch to move from one position to the other when all of said filters transfer from one position to the other.

6. An apparatus as set forth in claim 2 wherein the sensitivity of said exposure controlling means is adjustable for regulating said precoordination of said predetermined quantities.

7. An apparatus as set forth in claim 2 wherein said photoelectric cell means are disposed behind said color sensitive printing material, and a reflector being also disposed behind said material to collect and mix said light passing through said material and to reflect said light upon said photoelectric cell means.

8. An apparatus as set forth in claim 2 wherein reflectors are disposed in the path of light which is passed through said transparency to direct light from substantially the entire image area upon said photoelectric cell means.

9. An apparatus as set forth in claim 2 wherein a switch is provided for controlling said printing light source, said switch including locking means for cooperating with said subtractive color filters to lock said switch in a closed position when said subtractive color filters are out of the path of said light, and said locking means being constructed and arranged to permit said switch to be opened when the last of said subtractive color filters is interposed in said path of light.

10. An apparatus as set forth in claim 9 wherein said locking means is comprised of a notched switch element for receiving portions of each of said subtractive color filters, and said notched switch element being biased to open when all of said color filters are withdrawn from engagement with it.

References Cited in the file of this patent

UNITED STATES PATENTS

| | | |
|---|---|---|
| 1,208,739 | Brewster | Dec. 19, 1916 |
| 2,269,161 | Morse | Jan. 6, 1942 |
| 2,285,262 | Fess et al. | June 2, 1942 |
| 2,309,048 | Curry | Jan. 19, 1943 |
| 2,326,431 | Braunschmidt et al. | Aug. 10, 1943 |
| 2,518,947 | Simon | Aug. 15, 1950 |
| 2,521,954 | Tuttle et al. | Sept. 12, 1950 |
| 2,566,264 | Tuttle | Aug. 28, 1951 |
| 2,571,697 | Evans | Oct. 16, 1951 |
| 2,627,786 | Simmon | Feb. 10, 1953 |
| 2,691,917 | Curry | Oct. 9, 1954 |
| 2,853,921 | Biedermann et al. | Sept. 30, 1958 |

FOREIGN PATENTS

| | | |
|---|---|---|
| 409,287 | Great Britain | Apr. 23, 1934 |

UNITED STATES PATENT OFFICE
CERTIFICATE OF CORRECTION

Patent No. 3,127,267                           March 31, 1964

Paul Frost

It is hereby certified that error appears in the above numbered patent requiring correction and that the said Letters Patent should read as corrected below.

Column 2, line 6, for "negative" read -- negatives --; line 11, for "predonderant" read -- preponderant --; line 48, strike out "is", first occurrence; column 4, line 24, for "each" read -- said --; line 28, for "filter" read -- filters --.

Signed and sealed this 20th day of October 1964.

(SEAL)
Attest:

ERNEST W. SWIDER
Attesting Officer

EDWARD J. BRENNER
Commissioner of Patents